United States Patent
Masias

(10) Patent No.: US 10,622,686 B2
(45) Date of Patent: *Apr. 14, 2020

(54) BATTERY THERMAL MANAGEMENT SYSTEM INCLUDING BIMETALLIC MEMBER

(71) Applicant: FORD GLOBAL TECHNOLOGIES, LLC, Dearborn, MI (US)

(72) Inventor: Alvaro Masias, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 165 days.

This patent is subject to a terminal disclaimer.

(21) Appl. No.: 15/842,151

(22) Filed: Dec. 14, 2017

(65) Prior Publication Data

US 2018/0108958 A1    Apr. 19, 2018

Related U.S. Application Data

(63) Continuation of application No. 14/220,170, filed on Mar. 20, 2014, now Pat. No. 9,853,337.

(51) Int. Cl.
| | |
|---|---|
| *H01M 10/637* | (2014.01) |
| *H01M 10/613* | (2014.01) |
| *H01M 10/6566* | (2014.01) |
| *H01M 10/625* | (2014.01) |

(52) U.S. Cl.
CPC ....... *H01M 10/637* (2015.04); *H01M 10/613* (2015.04); *H01M 10/625* (2015.04); *H01M 10/6566* (2015.04); *H01M 2200/101* (2013.01); *H01M 2220/20* (2013.01)

(58) Field of Classification Search
CPC ........ H01M 2/02; H01M 2/10; H01M 10/613; H01M 10/6566; H01M 10/625; H01M 10/637

See application file for complete search history.

(56) References Cited

U.S. PATENT DOCUMENTS

| | | | |
|---|---|---|---|
| 2,300,418 | A * | 11/1942 | Hall .................. G05D 23/2754 236/101 R |
| 3,413,150 | A | 11/1968 | Kummer et al. |
| 4,376,809 | A | 3/1983 | Bindin |
| 6,407,533 | B1 | 6/2002 | Bartek et al. |
| 6,869,469 | B2 | 3/2005 | Grover et al. |
| 7,217,473 | B2 | 5/2007 | Ovshinsky et al. |
| 8,193,770 | B2 | 6/2012 | Zheng et al. |
| 2007/0275298 | A1 | 11/2007 | Igoris et al. |
| 2008/0268333 | A1 | 10/2008 | Barrella et al. |
| 2008/0293277 | A1 | 11/2008 | Kumar et al. |
| 2010/0081038 | A1 | 4/2010 | Hofmann et al. |
| 2010/0163326 | A1 | 7/2010 | Takamura et al. |
| 2010/0248010 | A1 | 9/2010 | Butt et al. |

(Continued)

FOREIGN PATENT DOCUMENTS

| | | |
|---|---|---|
| DE | 102009057163 A1 | 6/2011 |
| JP | 2008300103 | 12/2008 |
| WO | 2013051012 A2 | 4/2013 |

*Primary Examiner* — Kenneth J Douyette
(74) *Attorney, Agent, or Firm* — David B. Kelley; Carlson, Gaskey & Olds

(57) ABSTRACT

A battery thermal management system includes one or more bimetallic members moveable between a first position and a second position in response to a temperature change to selectively restrict flow of a coolant through a duct.

20 Claims, 5 Drawing Sheets

(56) References Cited

U.S. PATENT DOCUMENTS

| | | |
|---|---|---|
| 2011/0200867 A1 | 8/2011 | Culver et al. |
| 2011/0236183 A1* | 9/2011 | Amaral ................ F01D 11/005 415/134 |
| 2012/0263982 A1 | 10/2012 | Yasui et al. |
| 2013/0241493 A1* | 9/2013 | Kosaki .................... B60K 1/04 320/128 |

* cited by examiner

BATTERY THERMAL MANAGEMENT SYSTEM INCLUDING BIMETALLIC MEMBER

CROSS REFERENCE TO RELATED APPLICATION

This is a continuation of U.S. patent application Ser. No. 14/220,170, now U.S. Pat. No. 9,853,337, which was filed on Mar. 20, 2014.

TECHNICAL FIELD

This disclosure relates to an electrified vehicle, and more particularly, but not exclusively, to a battery thermal management system that employs a bimetallic member. The bimetallic member is adapted to alter the resistance to coolant flow through a battery pack as a function of cell temperature.

BACKGROUND

Electrified vehicles, such as hybrid electric vehicles (HEV's), plug-in hybrid electric vehicles (PHEV's), battery electric vehicles (BEV's), or fuel cell vehicles differ from conventional engine vehicles in that they are powered by one or more electric machines (i.e., electric motors and/or generators) instead of or in addition to an internal combustion engine. High voltage current for powering the electric machines is typically supplied by a high voltage traction battery pack.

Electrified vehicle battery packs are made up of multiple battery modules. The battery cells of each battery module may need to be thermally managed to remove excess heat out of the battery pack. Some battery packs are air cooled and typically push or pull pressurized air through a battery pack inlet and outlet. As air flows through the battery pack toward the outlet, a gradient of temperature and pressure may be created. This may cause the battery cells to age at varying rates.

SUMMARY

A battery thermal management system according to an exemplary aspect of the present disclosure includes, among other things, a bimetallic member moveable between a first position and a second position in response to a temperature change to selectively restrict flow of a coolant through a duct.

In a further non-limiting embodiment of the foregoing system, the bimetallic member is made of at least two dissimilar materials.

In a further non-limiting embodiment of either of the foregoing systems, the bimetallic member is a bimetallic coil.

In a further non-limiting embodiment of any of the foregoing systems, the bimetallic member is a bimetallic strip that includes a first strip of material and a second strip of material affixed to the first strip of material.

In a further non-limiting embodiment of any of the foregoing systems, a surface is connected to the bimetallic member.

In a further non-limiting embodiment of any of the foregoing systems, the surface is a plate or a vane.

In a further non-limiting embodiment of any of the foregoing systems, a control arm extends between the bimetallic member and a surface.

In a further non-limiting embodiment of any of the foregoing systems, a first side of the control arm is connected to the bimetallic member and a second side of the control arm is connected to the surface.

In a further non-limiting embodiment of any of the foregoing systems, movement of the bimetallic member between the first position and the second position moves the surface to change a dimension of the duct.

In a further non-limiting embodiment of any of the foregoing systems, the bimetallic member is comprised of a first material and the control arm and the surface are comprised of a second material that is different from the first material.

A battery pack according to another exemplary aspect of the present disclosure includes, among other things, a first battery cell, a second battery cell, and a duct that extends between the first battery cell and the second battery cell. A surface is positioned relative to the duct and moveable between a first position and a second position to control flow of coolant through the duct.

In a further non-limiting embodiment of the foregoing battery pack, the surface is part of a bimetallic member.

In a further non-limiting embodiment of either of the foregoing battery packs, the surface is connected to a bimetallic member.

In a further non-limiting embodiment of any of the foregoing battery packs, the surface is connected to a control arm that is connected to a bimetallic member.

In a further non-limiting embodiment of any of the foregoing battery packs, a bimetallic member is in contact with the first battery cell and the surface is in contact with the second battery cell.

A method according to another exemplary aspect of the present disclosure includes, among other things, controlling a flow of a coolant through a battery pack using a bimetallic member.

In a further non-limiting embodiment of the foregoing method, the controlling step includes moving the bimetallic member between a first position and a second position to change a dimension of a duct that extends between adjacent battery cells of the battery pack.

In a further non-limiting embodiment of either of the foregoing methods, the moving step includes positioning a surface relative to the adjacent battery cells in response to moving the bimetallic member.

In a further non-limiting embodiment of any of the foregoing methods, the controlling step includes moving the bimetallic member in response to absorbing heat from a battery cell housed within the battery pack.

In a further non-limiting embodiment of any of the foregoing methods, the controlling step includes redirecting the coolant from relatively cool portions of the battery pack to relatively warm portions of the battery pack with the bimetallic member.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery thermal management system for thermally managing one or more battery cells of a battery pack. The battery thermal management system employs a bimetallic member that is moveable to alter an amount of coolant that can be directed through ducts that extend between adjacent battery cells. Movement of the bimetallic member is driven by material properties and may be triggered by a temperature change of one or more battery cells. These and other features are discussed in greater detail below within this detailed description.

Figure 1:
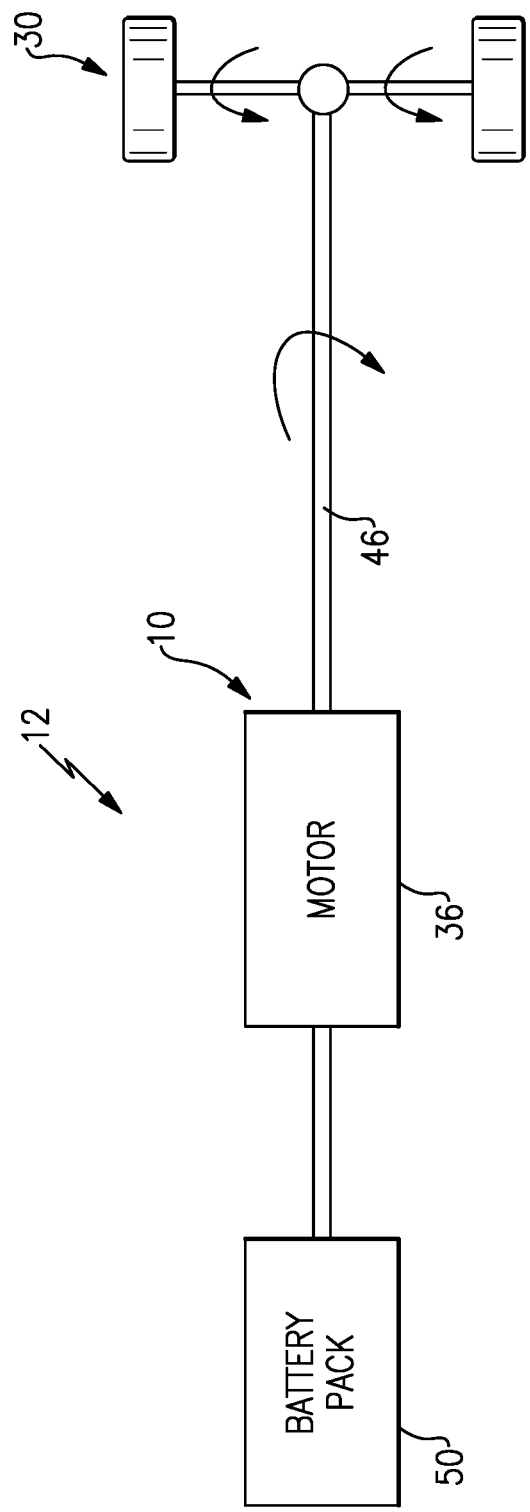
FIG. 1 schematically illustrates a powertrain of an electrified vehicle.

FIG. 1 schematically illustrates a powertrain 10 of an electrified vehicle 12. The electrified vehicle 12 may be a HEV, PHEV, BEV, or any other vehicle. In other words, this disclosure is not limited to any particular type of electrified vehicle, and could also extend to non-automotive electrified vehicles (e.g., locomotives, airplanes, ships, submarines, etc.).

The powertrain 10 includes a drive system having at least a motor 36 (i.e., an electric machine) and a battery pack 50. The battery pack 50 may include a high voltage battery that is capable of outputting electrical power to operate the motor 36. Although not shown by FIG. 1, the battery pack 50 may include multiple battery modules that are electrically connected to one another.

In one embodiment, the drive system generates torque to drive one or more sets of vehicle drive wheels 30 of the electrified vehicle 12. For example, the motor 36 can be powered by the battery pack 50 to electrically drive the vehicle drive wheels 30 by outputting torque to a shaft 46.

Of course, this view is highly schematic. It should be appreciated that the powertrain 10 of the electrified vehicle 12 could employ additional components, including but not limited to, an internal combustion engine, a generator, a power transfer unit, and one or more control systems, within the scope of this disclosure.

Figure 2:
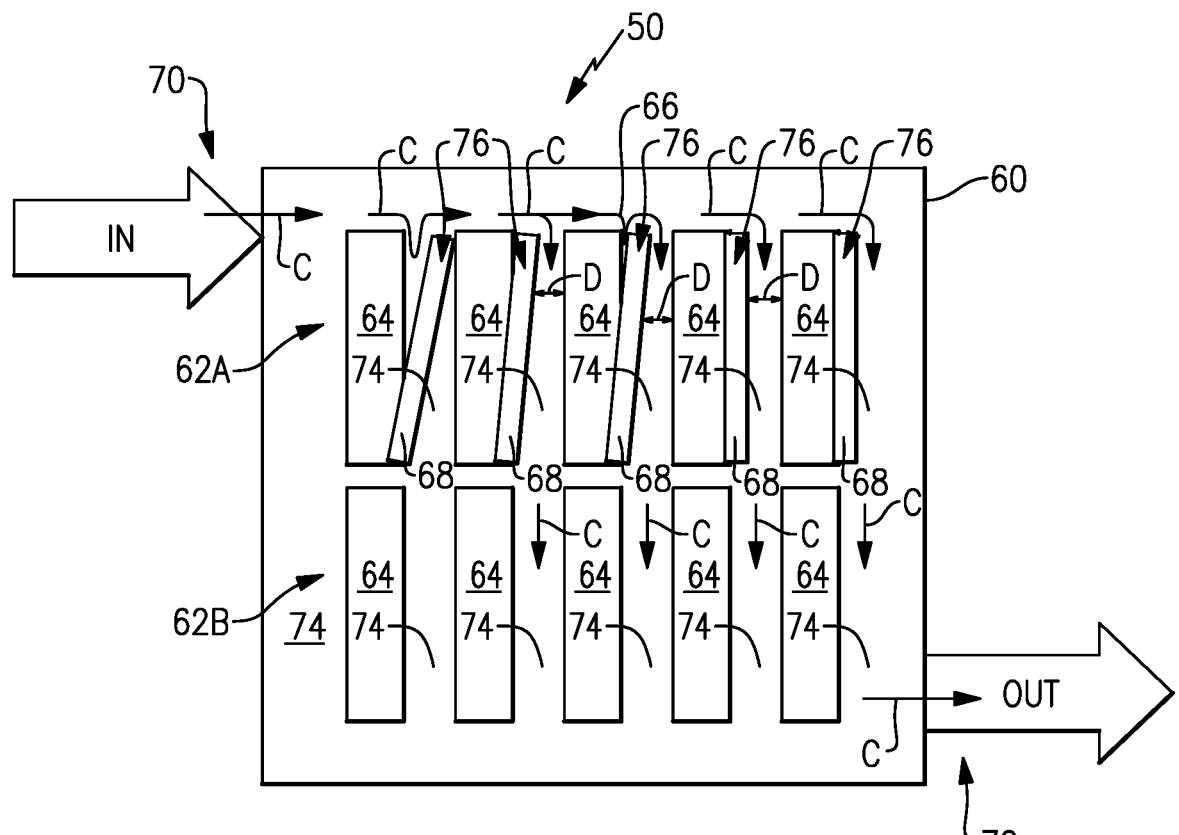
FIG. 2 illustrates a battery pack according to a first embodiment of this disclosure.

FIG. 2 illustrates a battery pack 50 for an electrified vehicle, such as the electrified vehicle 12 of FIG. 1 or any other electrified vehicle. The battery pack 50 includes a housing 60 that generally surrounds one or more battery modules 62A, 62B, etc. Two battery modules 62A, 62B are illustrated in FIG. 2; however, it should be understood that the battery pack 50 could include any number of battery modules.

Each battery module 62 includes a plurality of battery cells 64 (i.e., two or more cells). In one embodiment, the battery cells 64 may be lithium ion cells. In another embodiment, the battery cells 64 are nickel metal hydride cells. Other types of cells are additionally contemplated.

The battery cells 64 of each battery module 62 may be spaced from one another to establish ducts 74 between adjacent battery cells 64. Although not shown, spacers may be positioned within the ducts 74 to retain and position the battery cells 64 relative to one another. The ducts 74 define conduits for communicating coolant C, such as airflow, through the battery pack 50.

Heat may be generated by each battery cell 64 during charging and discharging operations. Heat may also be transferred into the battery cells 62 during key-off conditions of the electrified vehicle 12 as a result of relatively extreme (i.e., hot) ambient conditions. The battery pack 50 may therefore include a battery thermal management system 66 for thermally managing the heat generated by the battery cells 64.

The battery thermal management system 66 may include an inlet 70 and an outlet 72. Coolant C may enter the battery pack 50 through the inlet 70 and be circulated inside of the housing 60 prior to exiting through the outlet 72. For example, the coolant C may be communicated through the ducts 74 as well as over and around the battery cells 64 to remove heat from the battery cells 64. Therefore, the coolant C that exits the outlet 72 will be warmer than the coolant C that enters the inlet 70.

Figure 3:
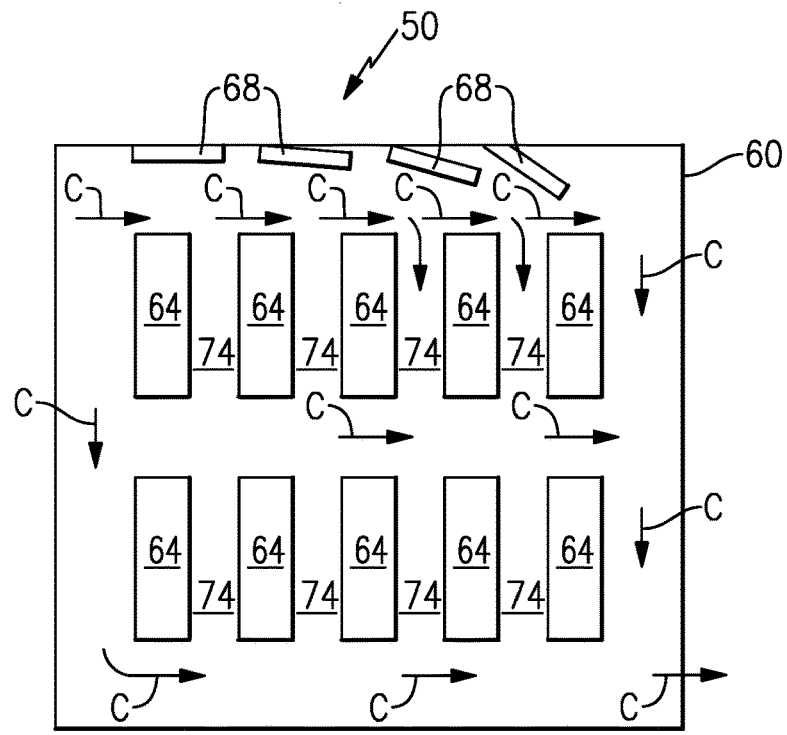
FIG. 3 illustrates a battery pack according to a second embodiment of this disclosure.
Figure 4:
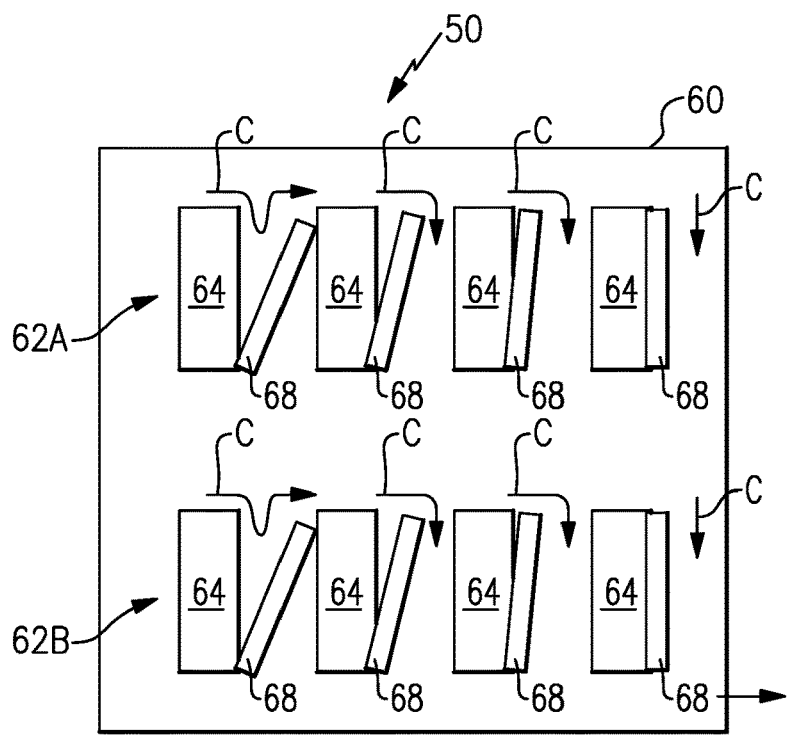
FIG. 4 illustrates a battery pack according to another embodiment of this disclosure.

In one embodiment, the battery thermal management system 66 includes one or more surfaces 68 that are positioned relative to the ducts 74. The surfaces 68 are moveable to control the flow of coolant C through the battery pack 50, including through the ducts 74. In a first non-limiting embodiment, the surfaces 68 are positioned to extend at least partially into the ducts 74 (i.e., between adjacent battery cells 64) of the first battery module 62A to control the flow of coolant C between the battery cells 64. In another embodiment, the surfaces 68 may be mounted to the housing 60 and moveable to control the flow of the coolant C into the ducts 74 (see FIG. 3). In yet another embodiment, the surfaces 68 are positioned between the battery cells 64 of both the battery module 62A and the battery module 62B (see FIG. 4). Multiple embodiments for moving the surfaces 68 to control the flow of the coolant C through the battery pack 50 are detailed below.

In a first non-limiting embodiment, best shown in FIG. 2, the surfaces 68 themselves are made of bimetallic members 76 that are moveable to change a dimension D of the ducts 74. For example, the bimetallic members 76 may absorb heat from the battery cells 64. As heat is absorbed, the bimetallic members 76 may move or straighten to permit a greater amount of coolant C to pass through the ducts 74. In one embodiment, the bimetallic members 76 are positioned or otherwise biased to close-off the ducts 74 (see top left portion of FIG. 2). Therefore, in cooler sections of the battery pack 50 (e.g., near battery cells 64 that are closer to the inlet 70), the bimetallic members 76 do not move, bend or otherwise alter their shape such that the surfaces 68 block the communication of coolant C through the ducts 74. In this way, the coolant C may be directed to relatively warmer areas of the battery pack 50 (e.g., near battery cells 64 that are closer to the outlet 72) without first becoming overheated prior to reaching these locations.

Figure 5:
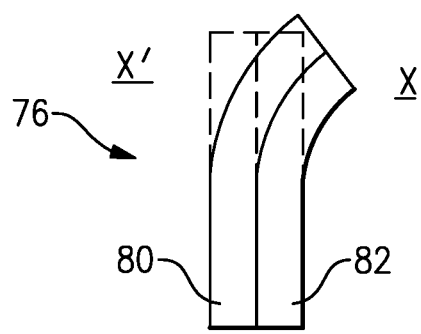
FIG. 5 illustrates a bimetallic strip that may be employed by a battery thermal management system.

FIG. 5 illustrates a first exemplary bimetallic member 76 that can be used to convert a temperature change into mechanical displacement. In this embodiment, the bimetallic member 76 is configured as a bimetallic strip that includes a first strip of material 80 and a second strip of material 82 affixed to the first strip of material 80. The first strip of material 80 may be affixed to the second strip of material 82 in any known manner. The first strip of material 80 and the second strip of material 82 are made of different materials. In one embodiment, the first strip of material 80 is steel and the second strip of material 82 is copper. In another embodiment, the first strip of material 80 is steel and the second strip of material 82 is brass. Other materials may also be suitable for constructing the bimetallic member 76.

Because the first strip of material 80 and the second strip of material 82 are different materials, they tend to expand at different rates as they are heated. Accordingly, the different expansions of these materials cause the bimetallic member 76 to bend toward position X' (shown in phantom lines) if heated and bend toward position X if cooled (or vice versa). The displacement of the bimetallic member 76 can be controlled by positioning the strip of material having the highest coefficient of thermal expansion at a desired position relative to the heat source.

Figure 6A:
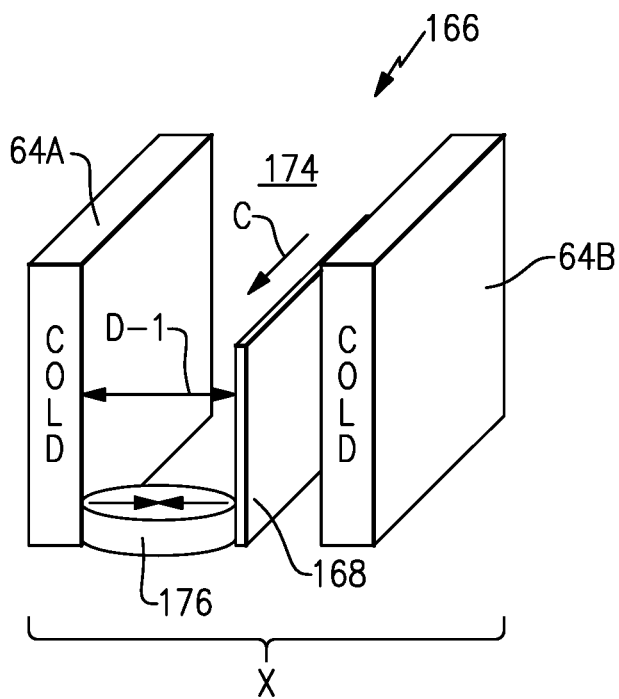
FIGS. 6A and 6B illustrate a battery thermal management system according to one embodiment of this disclosure.
Figure 6B:
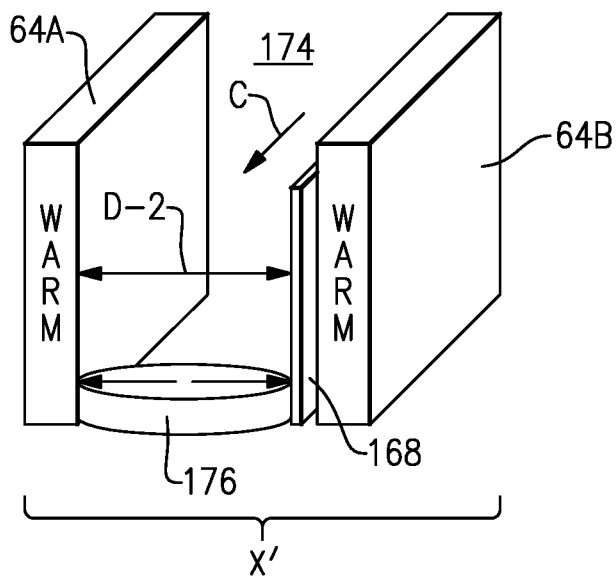

FIGS. 6A and 6B illustrate another exemplary battery thermal management system 166. In this disclosure, like reference numbers designate like elements where appropriate and reference numerals with the addition of 100 or multiples thereof designate modified elements that are understood to incorporate the same features and benefits of the corresponding original elements.

In this embodiment, the battery thermal management system 166 includes a bimetallic member 176 and a surface 168 connected to the bimetallic member 176. In other words, unlike the embodiment of FIG. 2, the surface 168 is a separate component from the bimetallic member 176. The surface 168 may be a plate, a vane or any other surface. In one embodiment, the bimetallic member 176 is attached or at least in contact with a battery cell 64A on a first side of a duct 174 and the surface 168 is attached or at least in contact with a battery cell 64B that is positioned on a second side of the duct 174.

The bimetallic member 176 is adapted to move the surface 168 to change a dimension associated with the duct 174 that extends between the adjacent battery cells 64A, 64B. For example, in a first position X in which the battery cells 64A, 64B are relatively cold (see FIG. 6A), the bimetallic member 176 is in a retracted state such that a portion of the surface 168 is moved away from the battery cell 64B to restrict the duct 174 to a dimension D-1. In a second position X' in which the battery cells 64A, 64B are relatively warm (see FIG. 6B), the bimetallic member 176 absorbs heat from the battery cell 64A and expands to move the surface 168 back toward the battery cell 64B, thereby opening the duct 174 to a dimension D-2. In one embodiment, the dimension D-2 is larger than the dimension D-1 such that additional coolant C is fed through the duct 174 to cool the battery cells 64A, 64B.

Figure 7:
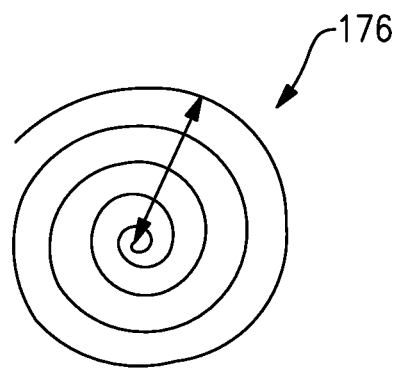
FIG. 7 illustrates a bimetallic coil that may be employed by a battery thermal management system.

FIG. 7 illustrates an exemplary bimetallic member 176 that may be utilized with the thermal management system 166 of FIGS. 6A and 6B. In this embodiment, the bimetallic member 176 is a bimetallic coil. The bimetallic coil may uncoil when heated (see FIG. 6B) and coil back to its original position when not being heated (see FIG. 6A). Of course, an opposite configuration is also contemplated in which the bimetallic member 176 coils when heated and uncoils when cooled.

Figure 8A:
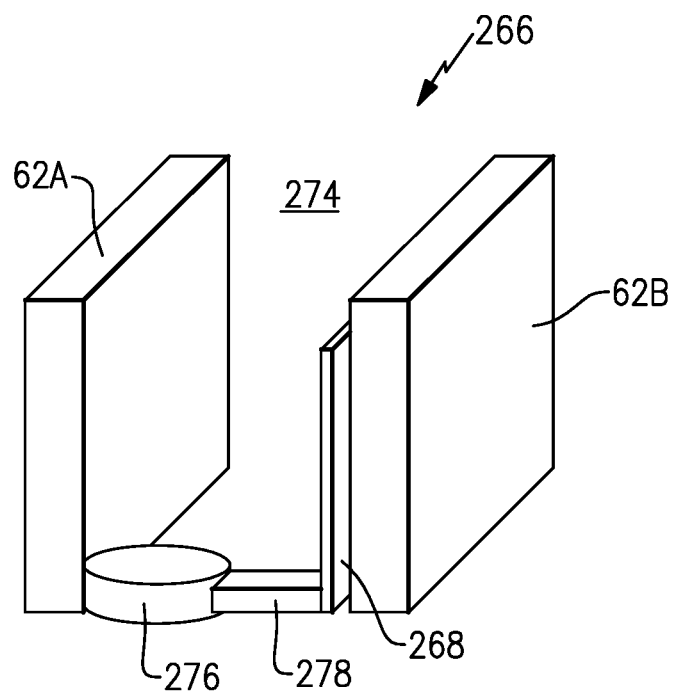
FIGS. 8A and 8B illustrate a battery thermal management system according to another embodiment of this disclosure.
Figure 8B:
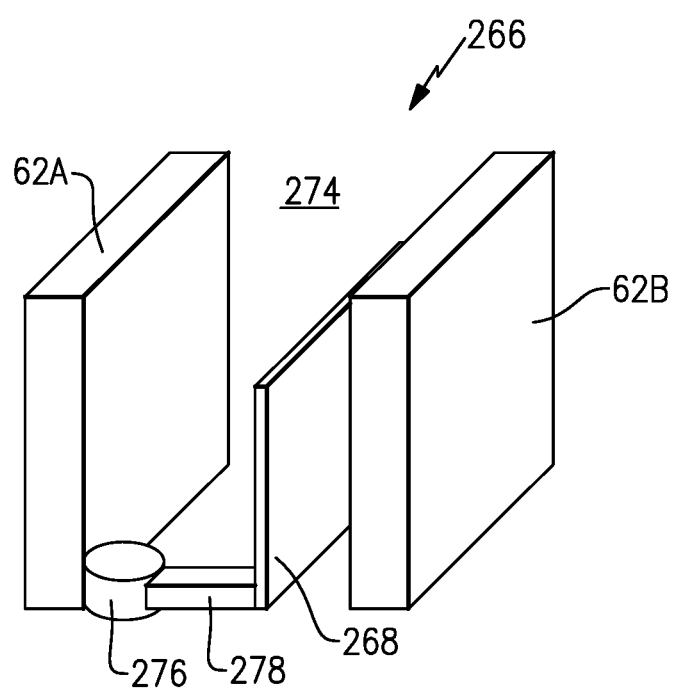

FIGS. 8A and 8B illustrate another exemplary battery thermal management system 266. The battery thermal management system 266 is similar to the battery thermal management system 166 of FIGS. 6A and 6B but includes a control arm 278. For example, in one non-limiting embodiment, the battery thermal management system 266 includes a bimetallic member 276, a surface 268 and the control arm 278. The control arm 278 extends between the bimetallic member 276 and the surface 268. In one embodiment, a first side of the control arm 278 is connected to the bimetallic member 276 and a second side of the control arm 278 is connected to the surface 268. Accordingly, movement of the bimetallic member 276 is transferred to the surface 268 through the control arm 278 in order to expand or restrict the duct 274.

In one embodiment, the surface 268 and the control arm 278 are made from the same material. Suitable materials include polymers and metals, including but not limited to, polypropylene, polybutylene, terephthalate, aluminum, steel and other materials.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal management system, comprising:
   an inlet for receiving a coolant within a battery pack;
   an outlet for expelling the coolant from the battery pack;
   a plurality of ducts extending between battery cells housed within the battery pack; and
   a plurality of bimetallic members moveable in response to a temperature change to control a flow of the coolant through the plurality of ducts,
   wherein each of the plurality of bimetallic members is a bimetallic coil.

2. The system as recited in claim 1, wherein each of the plurality of bimetallic members are made of at least two dissimilar materials.

3. The system as recited in claim 1, wherein each of the plurality of bimetallic members includes a first strip of material and a second strip of material affixed to the first strip of material.

4. The system as recited in claim 3, wherein the first strip of material is steel and the second strip of material is copper or brass.

5. The system as recited in claim 1, wherein the plurality of bimetallic members are mounted to a housing of the battery pack.

6. The system as recited in claim 1, wherein each of the plurality of bimetallic members is biased to close off one of the plurality of ducts.

7. The system as recited in claim 1, wherein, in response to absorbing heat from one or more of the battery cells, at least one of the plurality of bimetallic members moves to alter an amount of the coolant permitted to flow through one of the plurality of ducts.

8. The system as recited in claim 1, wherein the plurality of bimetallic members are configured to straighten in response to absorbing heat, thereby permitting a greater amount of the coolant to pass through the plurality of ducts.

9. The system as recited in claim 1, wherein the battery cells of the battery pack are arranged in a first battery module and a second battery module that is spaced apart from the first battery module, and each of the plurality of bimetallic members is positioned within one of the plurality of ducts associated with the first battery module.

10. A method, comprising:
controlling a flow of a coolant through a battery pack with a bimetallic member and a surface that is connected to the bimetallic member, wherein the bimetallic member and the surface are positioned within a duct that extends between a first battery cells and a second battery cell inside the battery pack; and
wherein the bimetallic member is attached to the first battery cell,
wherein, in a first position, the bimetallic member is biased to move the surface away from the second battery cell to restrict the duct,
wherein, in a second position, in response to absorbing heat from the first battery cells, the bimetallic member alters its shape to move the surface into contact with the second battery cell, thereby opening the duct for receiving the coolant.

11. The method as recited in claim 10, wherein controlling the flow of the coolant includes moving the bimetallic member between the first position and the second position to change a dimension of the duct that extends between the first and second battery cells.

12. The method as recited in claim 10, wherein controlling the flow of the coolant includes redirecting the coolant from relatively cool portions of the battery pack to relatively warm portions of the battery pack with the bimetallic member.

13. The method as recited in claim 10, wherein the bimetallic members is a bimetallic coil.

14. The method as recited in claim 10, wherein the bimetallic member is a bimetallic strip that includes a first strip of material and a second strip of material affixed to the first strip of material.

15. The method as recited in claim 14, wherein the first strip of material is steel and the second strip of material is copper or brass.

16. The method as recited in claim 10, wherein the coolant enters the battery pack through an inlet and is expelled from the battery pack through an outlet.

17. The method as recited in claim 10, wherein the surface is a plate.

18. The method as recited in claim 10, wherein the surface is a vane.

19. The method as recited in claim 10, wherein the surface is made from a different material than the bimetallic member.

20. A battery thermal management system, comprising:
an inlet for receiving a coolant inside a battery pack;
an outlet for expelling the coolant from the battery pack;
a duct extending between a first battery cell and a second battery cell of a battery module disposed inside the battery pack;
a bimetallic member attached to the first battery cell; and
a plate attached to the bimetallic member,
wherein, in a first position, the bimetallic member is retracted and the plate is moved away from the second battery cell to restrict a size of the duct,
wherein, in a second position, the bimetallic member is expanded in response to absorbing heat from the first battery cell and the plate is moved into contact with the second battery cell to increase the size of the duct,
wherein the bimetallic member includes a first strip of a first material and a second strip of second material that is affixed to the first strip of the first material,
wherein the plate is made from a material that is different from either the first material or the second material.

* * * * *